(12) United States Patent
Seo

(10) Patent No.: US 7,071,997 B2
(45) Date of Patent: Jul. 4, 2006

(54) METHOD OF DISPLAYING CHANNEL INDICATOR USING ON-SCREEN-DISPLAY

(75) Inventor: Yeong Man Seo, Daegu (KR)

(73) Assignee: LG Electronics, Inc., Seoul (KR)

( * ) Notice: Subject to any disclaimer, the term of this patent is extended or adjusted under 35 U.S.C. 154(b) by 552 days.

(21) Appl. No.: 10/262,066

(22) Filed: Oct. 2, 2002

(65) Prior Publication Data
US 2003/0067557 A1 Apr. 10, 2003

(30) Foreign Application Priority Data
Oct. 10, 2001 (JP) .................................... P2001-62475

(51) Int. Cl.
*H04N 5/50* (2006.01)

(52) U.S. Cl. ......................... 348/569; 348/731

(58) Field of Classification Search ................ 348/569, 348/570, 563, 564, 731; 725/37, 56, 57; H04N 5/50, H04N 5/445, 5/44
See application file for complete search history.

(56) References Cited

U.S. PATENT DOCUMENTS 5,737,029 A * 4/1998 Ohkura et al. ............... 725/56
6,094,237 A * 7/2000 Hashimoto ................... 348/731
6,118,493 A * 9/2000 Duhault et al. .............. 348/564

FOREIGN PATENT DOCUMENTS

CN 1315805 A 10/2001
JP 2000278620 A * 10/2000

* cited by examiner

*Primary Examiner*—Sherrie Hsia
(74) *Attorney, Agent, or Firm*—Birch, Stewart, Kolasch & Birch, LLP

(57) ABSTRACT

A method of displaying a channel indicator using an On-Screen-Display (OSD) function on a TV screen is disclosed. The method includes the steps of determining one of a plurality of selectable channels as a selected channel when a user presses one of a plurality of channel-selecting keys, and displaying a channel indicator on a prescribed region of the TV screen. The channel indicator includes channel identifiers of the selected channel and at least one set of adjacent channels being previously ordered or sequenced adjacent to the selected channel in a preprogrammed channel order. The user is able to convert to a desired channel conveniently by viewing the channel OSD indicator that includes non only the channel identifiers of the selected channel, but also channel identifiers its adjacent channels.

21 Claims, 4 Drawing Sheets

METHOD OF DISPLAYING CHANNEL INDICATOR USING ON-SCREEN-DISPLAY

CROSS-REFERENCE TO RELATED APPLICATIONS

This application claims the benefit of Korean Application No. P2001-62475, filed on Oct. 10, 2001, which is hereby incorporated by reference as if fully set forth herein.

BACKGROUND OF THE INVENTION

1. Field of the Invention

The present invention relates to a television system, and more particularly, to a method of displaying a channel indicator on a TV screen using an On-Screen-Display (OSD) function.

2. Discussion of the Related Art

Reference will now be made to an existing method of displaying a present-channel indicator on a TV screen using an On-Screen-Display (OSD) function, examples of which are illustrated in FIG. 1 and FIG. 2. A typical television system (not illustrated) generally includes a display unit; a microcomputer that generates a control signal for switching to a desired channel and displaying the channel number of the newly selected channel for a predetermined period of time on a predetermined region of a TV screen, upon receiving an input command for switching to the desired channel from a user; a tuner that tunes to the desired channel according to the control signal; and an image output unit performing required functions on an image signal of the tuned channel for enabling the display unit to display the image signal and the channel number of the desired channel.

When a user inputs a channel-switching command into a television system, the microcomputer initially stores the channel information of the desired channel selected by the user. Upon receiving a control signal from the microcomputer, the tuner tunes to the desired channel. Then the image output unit performs the required processes on an image signal of the tuned channel so that the display unit is able to display the image signal. The image output unit enables the display unit to display the channel number of the tuned channel for a predetermined period of time on a designated region on the TV screen by combining a channel OSD signal with the image signal of the tuned channel upon receiving a control signal from the microcomputer. The channel number displayed on the TV screen disappears after the predetermined period of time, and these processes of displaying the channel number of a desired channel are repeated when the user inputs another channel-switching command into the television system.

FIG. 1 is a flow chart illustrating the steps of the existing method of displaying a present-channel number on a TV screen using an OSD function. Referring to FIG. 1, the television system initially checks whether the user has inputted a channel-up command by pressing a channel-up button (S1). If the user has, then it tunes to a channel ordered right above the present channel and displays its corresponding channel number for the predetermined period of time on the designated region of the TV screen (S3) as shown in FIG. 2. Otherwise, the television system further checks whether the user has inputted a channel-down command by pressing a channel-down button (S4). If it is found that the user has inputted the channel-down command, then the television system tunes to a channel ordered right below the present channel and displays its corresponding channel number for the predetermined period of time on the designated region of the TV screen (S3).

Since the existing television system displays the channel number of the selected channel only, the user may not know which channels are sequenced adjacent to the presently selected channel before actually switching to one of such adjacent channels. In addition, there are only a limited number of channel-switching keys provided on a remotely control device: channel-up and channel down button keys. For this reason, it often takes long time for a user to switch to a desired channel with such remotely control device, and this may give a great inconvenience to the user.

SUMMARY OF THE INVENTION

Accordingly, the present invention is directed to a method of displaying a channel indicator on a TV screen using an On-Screen-Display (ODS) function that substantially obviates one or more problems due to limitations and disadvantages of the related art.

An object of the present invention is to provide a method of displaying a channel indicator on a TV screen using an OSD function that indicates not only the present channel, but also a set of adjacent channels previously ordered adjacent to the present channel in a preprogrammed order.

Another object of the present invention is to provide a method of displaying a channel indicator on a TV screen using an OSD function so that a user can conveniently and also quickly select and view a desired channel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of displaying a channel indicator using an On-Screen-Display (OSD) function on a screen of a TV system includes the steps of determining one of a plurality of selectable channels as a selected channel when a user presses one of a plurality of channel-selecting keys, and displaying a channel indicator on a prescribed region of the TV screen. The channel indicator includes channel identifiers of the selected channel and a first set of adjacent channels being previously ordered adjacent to the selected channel in a first preprogrammed channel order. In addition, the channel indicator further includes channel identifiers of a second set of adjacent channels being previously ordered adjacent to the selected channel in a second preprogrammed order.

The method further includes a step of determining one of a plurality of channel-indicating modes as a selected mode upon receiving a mode-selecting command from the user. The channel indicator is displayed on the TV screen according to the selected mode. The plurality of channel-indicating modes include a first channel-indicating mode in which the channel identifiers are represented by main-channel numbers, a second channel-indicating mode in which the channel identifiers are represented by sub-channel numbers, a third channel-indicating mode in which the channel identifiers are represented by names of broadcasting stations, and a fourth channel-indicating mode in which the channel identifiers are represented by types of broadcasting programs.

In another aspect of the present invention, a method of displaying a channel indicator using an OSD function on a screen of a TV system initially includes the steps of tuning to a first selected channel and displaying a first channel indicator on a prescribed region of the TV screen. The first channel indicator includes a first set of channel identifiers of the first selected channel and a first set of adjacent channels being previously ordered adjacent to the first selected channel in a preprogrammed channel order.

The method further includes the steps of determining one of the first set of adjacent channels as a newly selected channel when a user presses one of a plurality of channel-selecting keys, undisplaying the first channel indicator, and displaying a second channel indicator on the prescribed region. Similarly, the second channel indicator includes a second set of channel identifiers of the newly selected channel and a second set of adjacent channels being previously ordered adjacent to the newly selected channel in the preprogrammed channel order.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

One of the essential features of the present invention is that a user is able to switch to a desired channel by pressing not only channel up/down buttons, but also volume up/down buttons provided on a remote control device or on a TV key panel. Alternatively, the user may press one or more preprogrammed buttons other than the channel or volume up/down buttons for switching to the desired channel.

Figure 1:
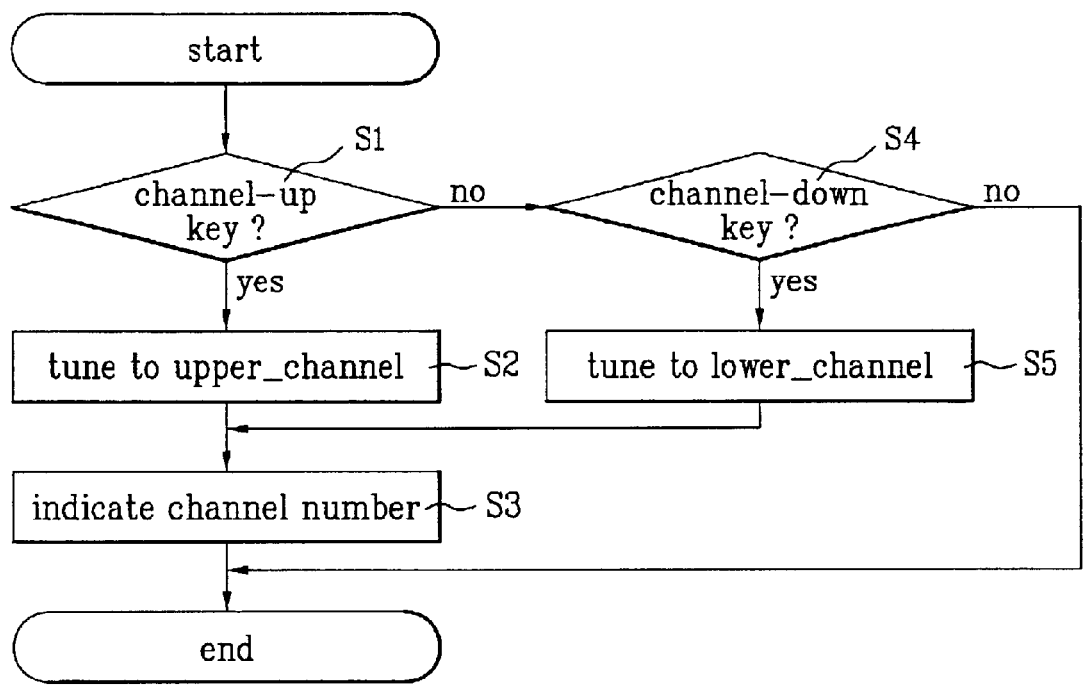
FIG. 1 is a flow chart illustrating an existing method of displaying a present-channel number on a TV screen using an OSD function.
Figure 2:
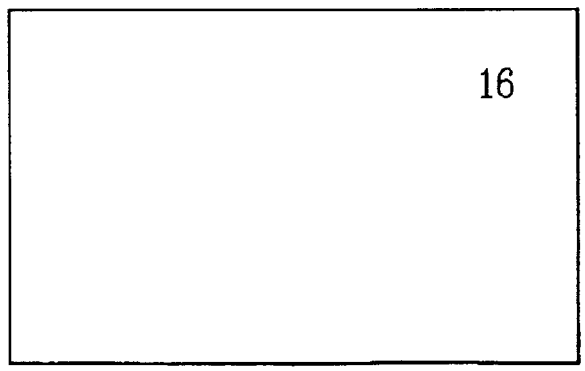
FIG. 2 illustrates a present-channel indicator displayed on the TV screen according to the method shown in FIG. 1.
Figure 3:
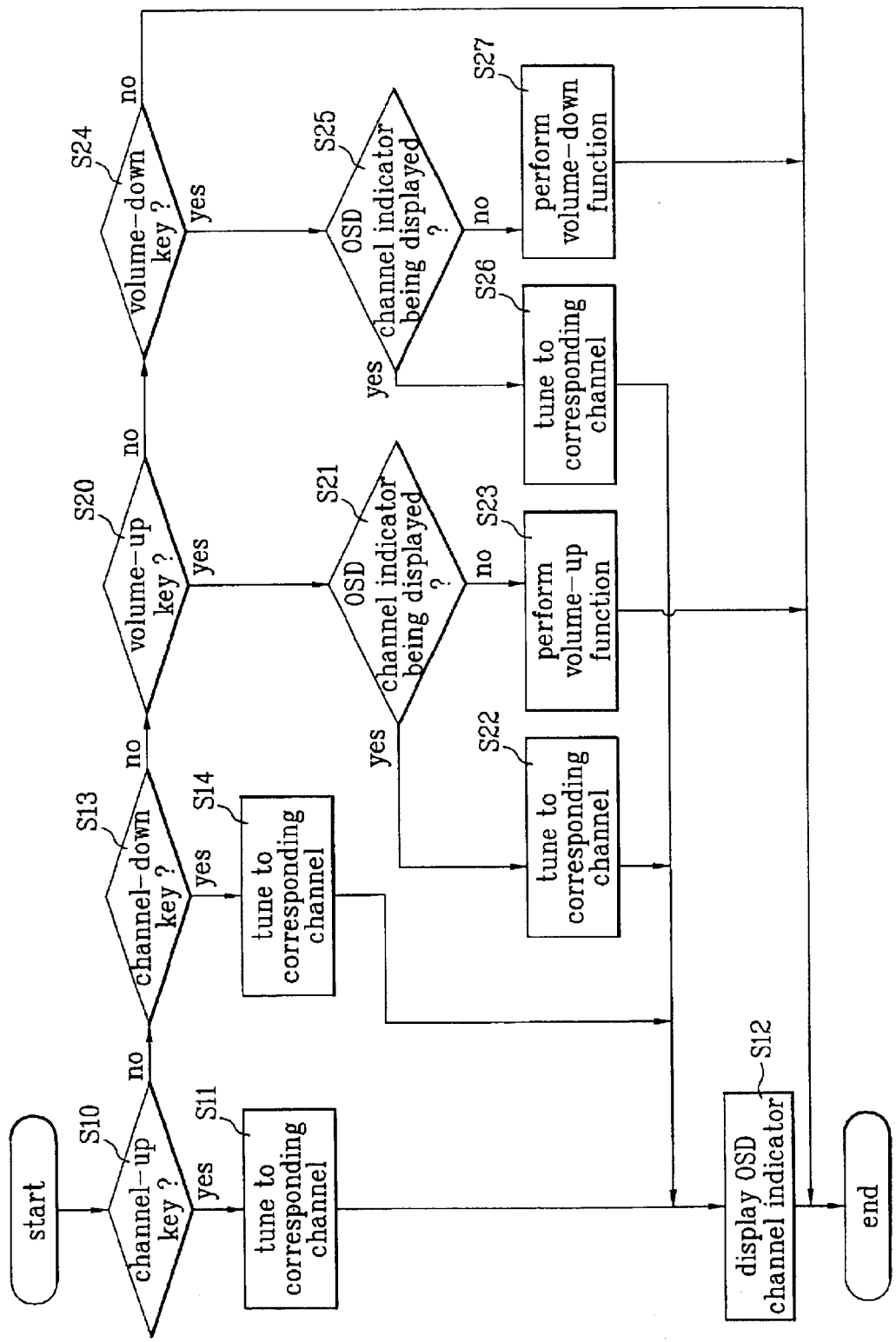
FIG. 3 is a flow chart illustrating a method of displaying a channel indicator on a TV screen using an On-Screen-Display (OSD) function in accordance with the present invention.

FIG. 3 is a flow chart illustrating a method of displaying a channel indicator on a TV screen using an On-Screen-Display (OSD) function in accordance with the present invention. Referring to FIG. 3, after a user initially selects a desired channel-indicating mode for a television system, a microcomputer included in the television system checks whether the user has inputted a channel-up command by pressing a channel-up button provided on a remote control device for the TV system or on a TV key panel (S10). If it is found in the step S10 that the user has inputted the channel-up command, then a tuner of the television system tunes to an adjacent channel that corresponds to the channel-up button. This adjacent channel is one of one or two sets of adjacent channels that are previously ordered adjacent to a currently selected channel in one or two preprogrammed channel orders (S11). Reference to the sets of adjacent channels will be made later in more detail.

Next, for a predetermined period of time, a display unit of the television system displays a channel indicator on a prescribed channel-indicating region of the TV screen according to the channel OSD mode selected previously (S12). The channel indicator includes channel identifiers of the tuned channel and a set of adjacent channels that are previously ordered adjacent to the tuned channel in a first preprogrammed channel order. The indicator may further include channel identifiers of another set of adjacent channels that are also previously ordered adjacent to the tuned channel in a second preprogrammed channel order.

In a case where there is only a single set of adjacent channels, the channel identifier of the tuned channel is displayed at the center of the prescribed channel-indicating region of the TV screen while channel identifiers of the set of adjacent channels are arranged within the prescribed region in a preprogrammed display order. In the other case where there are two sets of adjacent channels, the tuned channel identifier is initially positioned at the center of the prescribed region. Then the channel identifiers of the first set of adjacent channels are horizontally aligned with the tuned channel identifier in the first preprogrammed channel order. Similarly, the channel identifiers of the other set of adjacent channels are vertically aligned with the tuned channel identifier in the second channel order. In both cases, the channel indicator of each channel may be represented by the channel number, name of the corresponding broadcasting station, or program type of the corresponding channel.

Figure 4A:
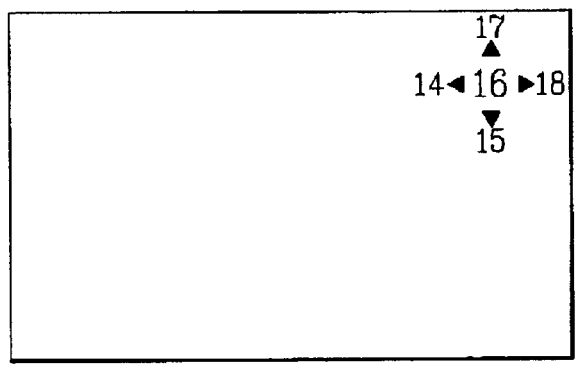
FIGS. 4A to 4E illustrate several examples of the channel indicator being displayed on the TV screen according to each channel OSD mode selected.

Several examples of the channel indicator corresponding to each channel OSD mode that a user initially selects will now be described in detail with reference to FIGS. 4A to 4E. First of all, FIG. 4A illustrates a first channel indicator being displayed on the TV screen according to a first channel OSD mode previously selected by the user. Referring to FIG. 4A, the channel identifiers of the tuned channel and its adjacent channels are represented by the main-channel numbers: channel 16 (present channel) and channels 14, 15, 17, and 18 (adjacent channels). As it is described earlier, the channel number of the present channel is displayed at the center of the prescribed region of the TV screen and channel numbers of its adjacent channels are displayed around the present-channel number in a predetermined display order. In this channel OSD mode, there is only a single set of adjacent channels.

Figure 4B:
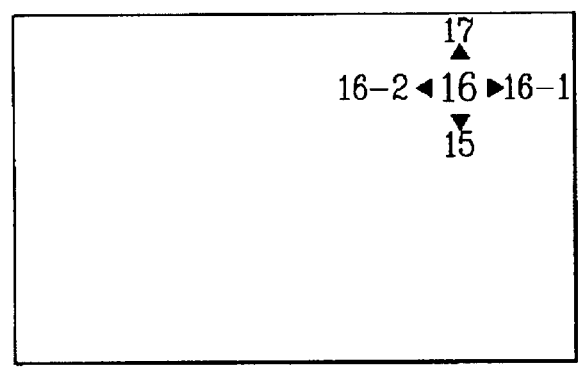

Next, FIG. 4B illustrates another channel indicator being displayed on the TV screen according to a second channel OSD mode previously selected by the user. Referring to FIG. 4B, the channel indicator includes the channel numbers of three main channels and two sub-channels: channels 15, 16, and 17 and channels 16-1 and 16-2. When the user selects channel 16, the channel number of the selected channel (present channel) is displayed in the center of the prescribed region of the TV screen, and channel numbers of its adjacent main channels are displayed above and below the present-channel number, respectively. In addition, the channel numbers of the adjacent sub-channels of the present channel are displayed on the left and right of the present channel number, respectively. In this channel OSD mode, the channel indicator includes the channel numbers of two sets of adjacent channels. One set of adjacent channels (channel 15 and 17) are previously ordered adjacent to the present channel (channel 16) in a first preprogrammed order, and the other set of adjacent channels (channel 16-1 and 16-2) are also previously ordered adjacent to the present channel in a second preprogrammed order. In this way, the user is able to quickly and conveniently find and select a desired channel by viewing the channel indicator shown in FIG. 4B.

Figure 4C:
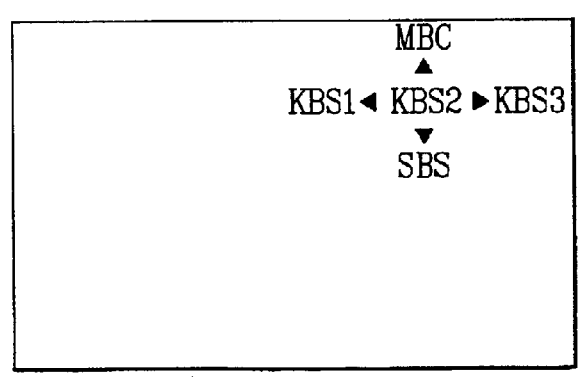

FIG. 4C illustrates another channel indicator being displayed on the prescribed region of the TV screen according to a third channel OSD mode previously selected by the user. Referring to FIG. 4C, the channel indicator includes the names of the broadcasting stations of a present channel selected by the user and its adjacent channels: KBS2, and KBS1, KBS3, MBC, and SBS. Similar to the above-mentioned channel indicators, the broadcasting station name of the present channel (KBS2) is displayed at the center of the prescribed region of the TV screen, and the broadcasting station names of its adjacent channel (KBS1, KBS3, MBC, and SBS) are displayed around the present-channel number in a preprogrammed display order.

Figure 4D:
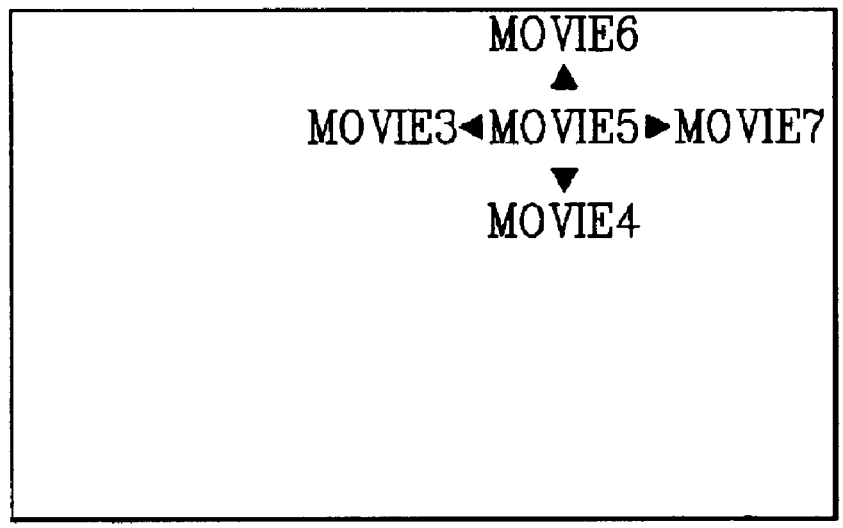

FIG. 4D illustrates another channel indicator being displayed on the prescribed region of the TV screen according to a fourth channel OSD mode previously selected by the user. Referring to FIG. 4D, only channels having a same program type, e.g., MOVIE, are indicated on the TV screen. The channel indicator includes the program-type channel identifier (MOVIE 5) of the present channel selected by the user and the program-type channel identifiers (MOVIE 3, MOVIE 4, MOVIE 6, and MOVIE 7) of the channels sequenced adjacent to the present channel in a preprogrammed channel order. As it is seen in the figure, MOVIE 5 is displayed at the center of the prescribed region of the TV screen, and all other program-type identifiers are displayed around MOVIE 5 in the prescribed region in a preprogrammed display order.

Figure 4E:
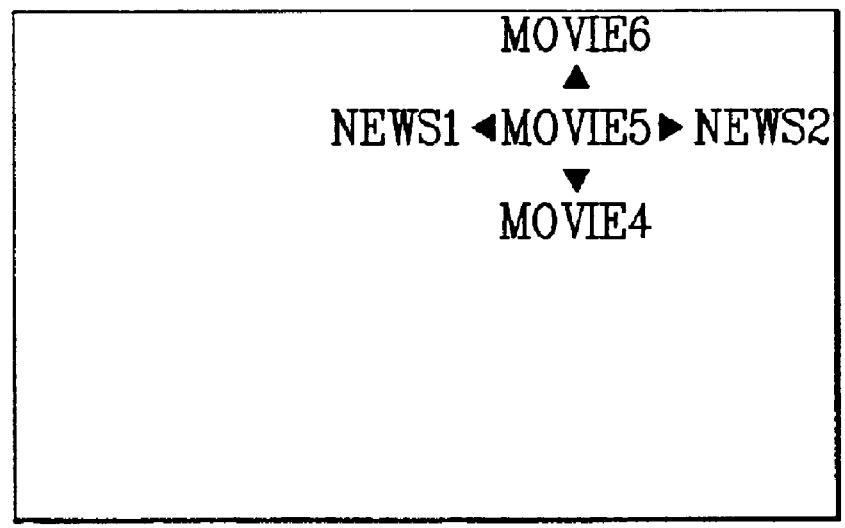

FIG. 4E illustrates another channel indicator being displayed on the prescribed channel-indicating region of the TV screen according to a fifth channel OSD mode previously selected by the user. Referring to FIG. 4E, channels with two independent program types, e.g., MOVIE and NEWS, are indicated on the TV screen. First, the program-type channel identifier (MOVIE 5) of the present channel is displayed in the middle of the channel-indicating region of the TV screen, and the program-type channel identifiers (MOVIE 4 and MOVIE 5) of the movie channels sequenced adjacent to the present channel in a first channel order are displayed below and above MOVIE 5, respectively. Then the program-type channel identifiers (NEWS 1 and NEWS 2) of the news channels also sequenced adjacent to the present channel in a second channel order are displayed on the left and right sides of MOVIE 5, respectively. In this way, the user is able to easily search for a desired movie channel by pressing the volume-up or volume-down button or search for a desired news channel by pressing the channel-up or channel-down button.

As described above, when the user selects a present channel after initially selecting one of the first to fifth channel OSD modes, a channel indicator corresponding to the selected channel OSD mode will be displayed on the TV screen. Referring back to FIG. 3, if it is found in the step S10 that the channel-up command is not inputted by the user, then the microcomputer further checks whether the user has inputted a channel-down command by pressing a channel-down button provided on the remote control device or TV key panel (S13). If it is found in the step S13 that the user has inputted the channel-down command, the tuner of the television system tunes to an adjacent channel that corresponds to the channel-down button (S14). This adjacent channel is also one of one or more sets of adjacent channels mentioned in the step S11. Next, for a predetermined period of time, the display unit of the television system displays a channel indicator on the prescribed region of the TV screen according to the channel OSD mode selected previously (S12). Similarly, the channel indicator includes channel identifiers of the tuned channel and one set of adjacent channels that are previously ordered adjacent to the tuned channel in a preprogrammed channel order. The indicator may further include channel identifiers of another set of adjacent channels that are also previously ordered adjacent to the tuned channel in another preprogrammed channel order.

If it is found in the step S13 that the user has not pressed the channel-down command, then the microcomputer further checks whether the user has inputted a volume-up command by pressing a volume-up button also provided on the remote control device or TV key panel (S20). If it is found that the user pressed the volume-up button, the microcomputer of the television system further checks whether a channel OSD indicator is currently displayed on the TV screen (S21). If it is found in the step S21 that the channel OSD indicator is currently displayed, then the tuner of the television system tunes to an adjacent channel that corresponds to the volume-up button (S22). This adjacent channel is also one of one or more sets of adjacent channels mentioned in the step S1.

Next, for a predetermined period of time, the display unit of the television system displays a channel indicator on the prescribed region of the TV screen according to the channel OSD mode selected previously (S12). Similarly, the channel indicator includes channel identifiers of the tuned channel and one set of adjacent channels that are previously ordered adjacent to the tuned channel in a preprogrammed channel order. The indicator may further include channel identifiers of another set of adjacent channels that are also previously ordered adjacent to the tuned channel in another preprogrammed channel order. On the other hand, if it is found in the step S21 that the channel OSD indicator is not currently displayed on the TV screen, the microcomputer generates a control signal for performing a typical volume-up function (S23).

Referring back to the step S20, if it is found that the user has not pressed the volume-up button, the microcomputer further checks whether the user has inputted a volume-down command by pressing a volume-down button also provided on the remote control device or TV key panel (S24). If it is found the user has pressed the volume-down button, the microcomputer of the television system further checks whether a channel OSD indicator is currently displayed on the TV screen (S25). If it is found in the step S25 that the channel OSD indicator is currently displayed, then the tuner of the television system tunes to an adjacent channel that corresponds to the volume-down button (S26). This adjacent channel is also one of one or more sets of adjacent channels mentioned in the step S11.

Next, for a predetermined period of time, the display unit of the television system displays a channel indicator on the prescribed region of the TV screen according to the channel OSD mode selected previously (S12). Similarly, the channel indicator includes channel identifiers of the tuned channel and one set of adjacent channels that are previously ordered adjacent to the tuned channel in a preprogrammed channel order. The indicator may further include channel identifiers of another set of adjacent channels that are also previously ordered adjacent to the tuned channel in another preprogrammed channel order. On the other hand, if it is found in the step S25 that the channel OSD indicator is not currently displayed on the TV screen, the microcomputer generates a control signal for performing a typical volume-down function (S27).

As described above, one of the advantages of the method of displaying a channel OSD indicator according to the present invention is that the user is able to convert to a desired channel conveniently by viewing the channel OSD indicator that includes not only the channel identifier of the present channel, but also channel identifiers of the channels that are previously sequenced in one or more preprogrammed orders. In addition, the user may search the desired channel by pressing not only the channel-up/down buttons provided on the remote control device or TV key panel, but also any other buttons such as volume-up/down buttons, providing an even greater convenience to the user for searching and selecting the desired channel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of displaying a channel indicator using an On-Screen-Display (OSD) function on a screen of a TV system, the method comprising the steps of:
    determining one of a plurality of selectable channels as a selected channel when a user presses one of a plurality of channel-selecting keys; and
    displaying a channel indicator on a prescribed region of said TV screen, by displaying channel identifiers of said selected channel and a first set of adjacent channels, said adjacent channels being previously ordered adjacent to said selected channel in a first preprogrammed channel order, without displaying channel identifers of the outer channels in the first programmable channel order.

2. The method of claim 1, further comprising the step of determining one of a plurality of channel-indicating modes as a selected mode upon receiving a mode-selecting command from said user, said channel indicator being displayed on said TV screen according to said selected mode.

3. The method of claim 2, wherein said plurality of channel-indicating modes include
    a first channel-indicating mode in which said channel identifiers are represented by main-channel numbers,
    a second channel-indicating mode in which said channel identifiers are represented by sub-channel numbers,
    a third channel-indicating mode in which said channel identifiers are represented by names of broadcasting stations, and
    a fourth channel-indicating mode in which said channel identifiers are represented by types of broadcasting programs.

4. The method of claim 1, wherein said selected channel identifier is positioned at the center of said prescribed region, said adjacent channel identifiers being arranged within said prescribed region in a preprogrammed display order.

5. The method of claim 1, wherein said selected channel identifier is positioned at the center of said prescribed region, said adjacent channel identifiers being horizontally or vertically aligned with said selected channel identifier in said preprogrammed channel order.

6. The method of claim 1, wherein said channel indicator further includes channel identifiers of a second set of adjacent channels being previously ordered adjacent to said selected channel in a second preprogrammed channel order.

7. The method of claim 6, further comprising the step of determining one of a plurality of channel-indicating modes as a selected mode upon receiving a mode-selecting command from said user, said channel indicator being displayed on said TV screen according to said selected mode.

8. The method of claim 7, wherein said channel identifiers of said selected channel, said first set of adjacent channels, and said second set of adjacent channels are represented by main-channel numbers, sub-channel numbers, names of broadcasting stations, or types of broadcasting programs.

9. The method of claim 6, wherein said selected channel identifier is positioned at the center of said prescribed region, said channel identifiers of said first and second sets of adjacent channels being arranged within said prescribed region in a preprogrammed display order.

10. The method of claim 6, wherein said selected channel identifier is positioned at the center of said prescribed region, said channel identifiers of said first set of adjacent channels being horizontally aligned with said selected channel identifier in said first preprogrammed channel order, said channel identifiers of said second set of adjacent channels being vertically aligned with said selected channel identifier in said second preprogrammed channel order.

11. The method of claim 1, wherein the step of displaying the channel indicator includes displaying channel identifiers of said selected channel and four or less adjacent channels in the first preprogrammed channel orders.

12. A method of displaying a channel indicator using an On-Screen-Display (OSD) function on a screen of a TV system, the method comprising the steps of:
    tuning to a first selected channel and displaying a first channel indicator on a prescribed region of said TV screen, said first channel indicator including a first set of channel identifiers of said first selected channel and a first set of adjacent channels being previously ordered adjacent to said first selected channel in a preprogrammed channel order;
    determining one of said first set of adjacent channels as a newly selected channel when a user presses one of a plurality of channel-selecting keys; and
    undisplaying said first channel indicator and displaying a second channel indicator on said prescribed region, said second channel indicator including a second set of channel identifiers of said newly selected channel and a second set of adjacent channels being previously ordered adjacent to said newly selected channel in said preprogrammed channel order.

13. The method of claim 11, furthe comprising the step of determining one of a plurality of channel-indicating modes as a selected mode upon receiving a mode-selecting command from said user, each of said first and second channel indicators being displayed on said TV screen according to said selected mode.

14. The method of claim 12, wherein said plurality of channel-indicating modes include
    a first channel-indicating mode in which said first and second sets of channel identifers are represented by main-channel numbers, a secojd channel-indicating mode in which said first and second sets of channel identifiers are represented by sub-channel numbers, a third channel-indicating mode in which said first and second sets of channels identifiers are represented by broadcasting stations, and a fourth channel-indicating mode in which said first and second sets of channel identifiers are represented by types of broadcasting programs.

15. The method of claim 11, wherein said first or newly selected channel identifiers is positioned at the center of said prescribed region, said identifiers of said first or second set of adjacent channels being arranged within said prescribed region in a preprogrammed display order.

16. The method of claim 11, wherein said channel identifiers of said first or second set of adjacent channels are aligned with said first or newly selected channel identifiers in said preprogrammed order.

17. The method of claim 11, wherein said plurality of channel-selecting keys include a first channel-up key, a first channel-down key, a second channel-up key, and a second channel-down key.

18. The method of claim 16, wherein said first channel-up and channel-down keys are ordinary channel-up and channel-down button keys provided on a remote control device for said TV system or on a key panel of said TV system.

19. The method of claim 16, wherein said second channel-up and channel- down keys are ordinary volume-up and volume-down button keys provided on a remote control device for said TV system or on a key panel of said TV system. channel-down key as said selected channel and tuning to said fourth selectable channel.

20. The method of claim 16, wherein said newly selected channel determining steps includes responsive to said pressed channel-selecting key being said first channel-up key, determining one of said first set of adjacent channel that corresponds to said first channel-up key as said newly selected channel and tuning to said newly selected channel, responsive to said pressed channel-selecting key bing said first channel-down key, determining of said first set of adjacent channels that corresponds to said first channel-down key as said newly selected channel and tuning to said newly selected channel, responsive to said pressed channel-selecting key being said and second channel-up key, determining one of said first set of adjacent channels that corresponds to said second channel-up key as said newly selected channel and tuning to said newly selected channel, and responsive to said pressed channel-selecting key being said second channel-down key, determining one of said first set of adjacent channels that corresponds to said second channel- down key as said selected channel and tuning to said fourth selectable channel.

21. A method of displaying a channel indicator using an On-Screen-Display (OSD) function on a screen of a TV system, the method comprising the steps of:

determining one of a plurality of selectable channels as a selected channel when a user presses one of a plurality of channel-selecting keys; and displaying a channel indicator on a prescribed region of said TV screen, said channel indicator including channel identifiers of said selected channel and a first set of adjacent channels, said adjacent channels being previously ordered adjacent to said selected channel in a first preprogrammed channel order; and determining one of a plurality of channel-indicating modes as a selected mode upon receiving a mode-selecting command from said user; said channel indicator being displayed on said TV screen according to said selected mode, wherein said plurality of channe-indicating modes include a first channel-indicating mode in which said channel identifiers are represented by main-channel numbers, a second channel-indicating mode in which said channel identifiers are represented by sub-channel numbers, a third channel-indicating mode in which said channel identifiers are represented by names of broadcasting stations, and a fourth channel-indicating mode in which said channel identifiers are represented by types of broadcasting programs.

* * * * *